US008162130B2

(12) United States Patent  (10) Patent No.: US 8,162,130 B2
Rabec  (45) Date of Patent: Apr. 24, 2012

(54) METHOD AND DEVICE FOR FORMING BATCHES OF SUBSTANTIALLY PARALLELEPIPED OBJECTS MOVING ON A CONVEYOR BELT

(75) Inventor: Dominique Rabec, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 185 days.

(21) Appl. No.: 12/670,982

(22) PCT Filed: Jul. 16, 2008

(86) PCT No.: PCT/FR2008/051335
§ 371 (c)(1),
(2), (4) Date: Jan. 27, 2010

(87) PCT Pub. No.: WO2009/019382
PCT Pub. Date: Feb. 12, 2009

(65) Prior Publication Data
US 2010/0187070 A1  Jul. 29, 2010

(30) Foreign Application Priority Data
Jul. 30, 2007  (FR) ...................................... 07 05549

(51) Int. Cl.
*B65G 47/26* (2006.01)
(52) U.S. Cl. .................. 198/617; 198/418.7; 198/418.8; 198/419.3; 198/426
(58) Field of Classification Search ............... 198/418.2, 198/418.3, 418.7, 418.8, 419.1, 419.3, 426, 198/429, 617
See application file for complete search history.

(56) References Cited

U.S. PATENT DOCUMENTS

| 3,037,610 | A |   | 6/1962  | Morton et al. |          |
|-----------|---|---|---------|---------------|----------|
| 3,194,382 | A | * | 7/1965  | Nigrelli et al. | 198/418.1 |
| 3,352,403 | A |   | 11/1967 | Blake         |          |
| 3,368,660 | A | * | 2/1968  | Standley et al. | 198/419.3 |
| 3,823,813 | A | * | 7/1974  | Holt          | 198/418.1 |
| 4,093,063 | A |   | 6/1978  | Calvert et al. |          |
| 4,228,901 | A | * | 10/1980 | Watzka et al. | 209/684  |

(Continued)

FOREIGN PATENT DOCUMENTS
DE  3118464 A1  11/1982
(Continued)

*Primary Examiner* — Douglas Hess
(74) *Attorney, Agent, or Firm* — Sughrue Mion, PLLC

(57) ABSTRACT

The method of the invention comprises immobilizing the queue on its entire length using flaps (10, 11) for creating a gap between two consecutive objects and for isolating downstream from said gap a group of objects defining the batch; inserting into the gap thus created a first cleat (39) having a longitudinal advance speed Vt lower than the running speed Va of the conveyor belt (3); releasing said immobilized queue and making the cleat in charge of it; starting a new temporary immobilization of said queue; and so on. The device for implementing the method comprises: on the one hand, means in the form of flaps (10, 11) for immobilizing the queue on the length thereof by clamping in order to define a gap between two consecutive objects in said queue, and on the other hand, a means in the form of cleats (39) that can be inserted in and take in charge the immobilized queue. Each cleat (39) is associated with a roller-shaped member (38) for maneuvering the flap (10). The reactive flap (11) is submitted to the action of spring means (16) for automatically returning the flap (10) into place.

8 Claims, 6 Drawing Sheets

U.S. PATENT DOCUMENTS

| | | | | |
|---|---|---|---|---|
| 4,360,098 A | * | 11/1982 | Nordstrom | 198/418.1 |
| 4,443,995 A | * | 4/1984 | Myers et al. | 53/443 |
| 4,932,190 A | * | 6/1990 | Bergner et al. | 53/447 |
| 5,035,315 A | * | 7/1991 | Fukusaki et al. | 198/419.2 |
| 5,147,027 A | | 9/1992 | Cruver | |
| 5,253,744 A | * | 10/1993 | Steeber | 198/347.3 |
| 5,979,147 A | * | 11/1999 | Reuteler | 53/448 |
| 6,182,814 B1 | * | 2/2001 | Koehler | 198/418.7 |
| 6,446,785 B1 | | 9/2002 | Tremblay | |
| 6,520,316 B2 | * | 2/2003 | De Guglielmo et al. | 198/419.3 |
| 6,766,628 B2 | * | 7/2004 | Guidetti | 53/443 |
| 7,726,463 B2 | * | 6/2010 | Aronsson | 198/419.3 |
| 7,874,417 B2 | * | 1/2011 | Oppici | 198/419.3 |
| 2003/0111321 A1 | | 6/2003 | Van Oss et al. | |
| 2004/0050663 A1 | | 3/2004 | Ford et al. | |
| 2006/0162826 A1 | | 7/2006 | Beguinot et al. | |
| 2009/0032373 A1 | | 2/2009 | Petrovic | |

FOREIGN PATENT DOCUMENTS

| | | |
|---|---|---|
| DE | 3825069 A1 | 1/1990 |
| EP | 1717170 A1 | 11/2006 |
| FR | 2847242 A1 | 5/2004 |
| FR | 2884507 A1 | 10/2006 |
| GB | 798944 A | 7/1958 |
| GB | 2052420 A | 1/1981 |

* cited by examiner

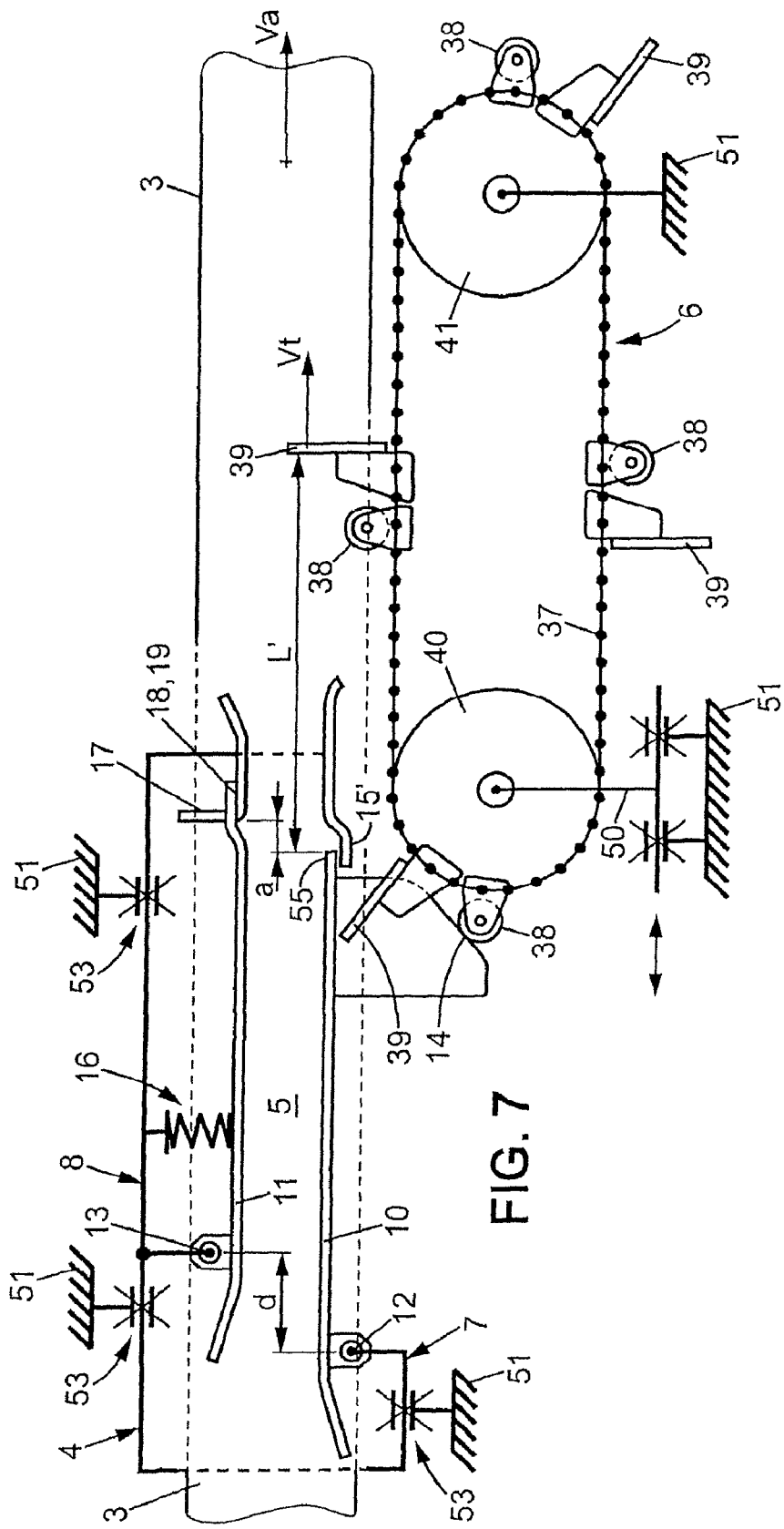

METHOD AND DEVICE FOR FORMING BATCHES OF SUBSTANTIALLY PARALLELEPIPED OBJECTS MOVING ON A CONVEYOR BELT

CROSS REFERENCE TO RELATED APPLICATIONS

This application is a National Stage of International Application No. PCT/FR2008/051335 filed Jul. 17, 2008, claiming priority based on French Patent Application No. 0705549, filed Jul. 30, 2007, the contents of all of which are incorporated herein by reference in their entirety.

FIELD OF THE INVENTION

The present invention relates to a method for forming batches of substantially parallelepiped objects moving continuously on a conveyor belt to feed, for example, a tight packing machine; it also relates to the device for the implementation of said method.

DESCRIPTION OF THE PRIOR ART

More specifically, the invention relates to the formation of batches of substantially parallelepiped objects, such as cartons of milk or fruit juice, with a view to the packaging thereof by a tight packing machine of the type described in document FR 2847242, for example.

This tight packing machine must be fed with extreme, faultless precision, since, after this packaging, the packages are palletized and routed to the point of sale thereof. The slightest incident may have repercussions on a large proportion of the batches or even the pallet.

However, products such as fruit juice or other cartons are relatively difficult to handle, particularly as, in some cases, they may comprise a straw which is attached directly on a side face of the product.

In this field relating to the splitting of a product queue, the document DE 3825069 describes a conveying device for separating trays in single file, one behind the other.

This separation device comprises a passage formed from two flaps which are hinged to create a temporary diversion of the passing tray and to guide same to an abutment arranged on the side of the conveying track, said abutment immobilizing the tray in question for a sufficient time to create a gap between the immobilized tray and the previous tray.

Such a device may operate at relatively high outputs for separating trays but it is not suitable for forming, at high outputs, batches consisting of products such as cartons.

The document EP 1717170 describes a palletizing installation comprising a device for preparing batches with packages arriving in single file.

The front of the queue is taken in charge by an abutment and, once the number of packages forming the batch has been reached, the queue is stopped by a gripper system. While the queue is stopped, the batch is moved transversally to a palletizing table.

The sequential nature of this type of device is not suitable for very fast outputs such as those encountered in installations for preparing batches consisting of carton type products.

SUMMARY OF THE INVENTION

The present invention proposes to solve the problems of packaging these substantially parallelepiped milk, fruit juice or other carton type objects in batches; it proposes a method and a device for the implementation thereof making it possible to operate at high outputs with maximum safety and efficiency.

In this way, according to a first of the aspects thereof, the present invention relates to a method for forming batches of substantially parallelepiped objects moving aligned and adjacent to each other, in single file, said objects, having a length l, being conveyed by a conveyor belt advancing at a longitudinal speed Va, said method consisting of:

immobilizing said queue, on the entire length thereof, in a passage, using stopping means which act sequentially, to create a gap between two consecutive objects and to isolate, downstream from said gap, a group of objects defining the batch with the programmed number of objects thereof, inserting into the gap thus created a first cleat having a longitudinal advance speed Vt lower than Va, releasing said immobilized queue and having said first cleat handle same, at the leading object thereof, starting a new temporary immobilization of said queue, with a view to inserting a second cleat in the new gap thus created, when the distance covered by the first cleat, measured from the end of said stopping means, is equivalent to at least the length L of the batch of objects, releasing the queue retained by said stopping means to have same handled by said second cleat, releasing the batch retained by said first cleat and so on, starting another stoppage of the queue, etc.

Again according to the invention, the method for immobilizing the queue consists of:

deforming the passage so as to reduce the entry cross-section thereof to immobilize the queue by blocking the object(s) in said entry, applying, on the side faces of said objects which are in said passage, a pressure wherein the intensity decreases between said entry of said passage and the downstream end thereof to reduce the contact pressure between said objects, placing, at the end of said passage, a safety stop in the form of an abutment to hold the downstream object at the front of the queue. This specific feature makes it possible to prevent the blockage of the downstream object, forming the front of the queue, against the safety abutment and also enables the use of simple means, detailed hereinafter, to deform the passage wherein the objects are moving.

According to a preferential arrangement of the invention, the gap created between consecutive objects, when the queue is stopped, has a length which is the order of half the length l of said objects.

Again according to the invention, the difference in speed between the object conveyor belt and the cleats for handling the various batches of objects is of the order of 10 to 15% with a lower speed for said cleats so as to create a gap between the batches before presenting same to the tight packaging machine, for example.

According to a further arrangement of the invention, the cleats handle and guide the batch of objects over a distance of the order of 1.5 times the length L of said batch of objects.

The invention also relates to a device for the implementation of the method for forming batches using objects moving in single file, adjacent to each other, conveyed by the endless belt of a conveyor, said device comprising:

means for immobilizing the queue on the entire length thereof so as to create a gap E between two consecutive objects of said queue and, means in the form of cleats, suitable for being inserted in the gap thus created, for, in particular, handling the front of the immobilized queue, said immobilization means and said cleats operating in a coordinated manner to start the immobilization of the queue when the cleat for handling the queue, after said queue has been released, has covered a distance which, measured from the end of said immobilization means, is equivalent at least to the length L of the batch to be prepared.

According to a preferential arrangement of the invention, the means for immobilizing the queue consist of:

flaps arranged facing each other forming a passage wherein the objects pass: —one deflecting flap and—one reactive flap, each flap being movable about a vertical axis situated at the upstream portion thereof, respectively, means for pivoting said deflecting flap in the direction of the other flap so as to deform said passage, means for impeding the reaction movement of the reactive flap when it is pushed, by means of the objects, by the deflecting flap, said means being used to carry out rapid and effective tightening or clamping of the queue for almost instantaneous immobilization.

Again according to the invention, the axes of the flaps are offset longitudinally: the axis of the reactive flap being situated downstream from the axis of the deflecting flap, at a distance between the length l and half this length of the objects, said distance being measured on the longitudinal feed axis of the objects.

This structural arrangement makes it possible to deform the passage by reducing the width of the entry thereof and this deformation is performed a relatively moderate force by means of the lever effect given to said deflecting flap by the position of the hinge axis thereof.

The deformation of the passage forms a type of bottleneck and makes it possible to block the queue not at the end thereof, as is generally the case, but considerably upstream from the front of the queue; for this reason, the contact pressure between the objects is released and the leading object may even be practically free.

According to a further arrangement of the invention, the reactive flap is retracted, under the effect of the deflecting flap, via the objects arranged between same, said reactive flap, by retracting, releasing a safety stop in the form of an abutment capable of temporarily holding the upstream object forming the front of the queue.

Again according to the invention, the cleats are regularly distributed and carried by a motor-driven endless chain wherein the active side is parallel with the object feed direction and arranged downstream from the deflecting flap, said cleats being spaced by a pitch P which is substantially greater than the length L of the batch of objects, of the order of a few millimeters, between 1 and 5 mm depending on the type of objects.

According to a preferential arrangement of the invention, the cleat is associated, on the endless chain, with a member for maneuvering the deflecting flap, said maneuvering member engaging with a cam-shaped fitting arranged on said deflecting flap so as to pivot same as the cleat approaches same, the assembly formed by the roller and the cam making it possible to coordinate the stoppage of the queue and the passage of the cleat for the insertion of said cleat in the gap created between two objects by the immobilization of said queue.

Again according to the invention, the reactive flap is impeded by spring type means, said reactive flap performing the automatic repositioning of the deflecting flap, by means of said spring, via the objects moving between same, when the roller leaves the cam of said deflecting flap.

According to a further arrangement of the invention, the length of the deflecting flap is, for example, of the order of the length of three to five objects.

Again according to the invention, the deflecting and reactive flaps and the downstream abutment are arranged on the same structure wherein the position is longitudinally adjustable in relation to the general frame to adapt to changes in the formats of the objects and/or the batches to be formed, said structure being adjusted longitudinally in relation to the position of the upstream guiding wheel of the endless chain comprising the rollers and the cleats, said position of said upstream wheel being in turn longitudinally adjustable to accommodate different chain models wherein said cleats and rollers are distributed according to a pitch suited to the length L of said batches to be prepared.

BRIEF DESCRIPTION OF THE DRAWINGS

The present invention is now described using a merely illustrative and in no way limitative example of the scope of the present invention, using the following illustrations, wherein:

FIG. 7 represents, in the form of a functional diagram, the essential components of the batch preparation device.

DETAILED DESCRIPTION OF THE INVENTION

Figure 1:
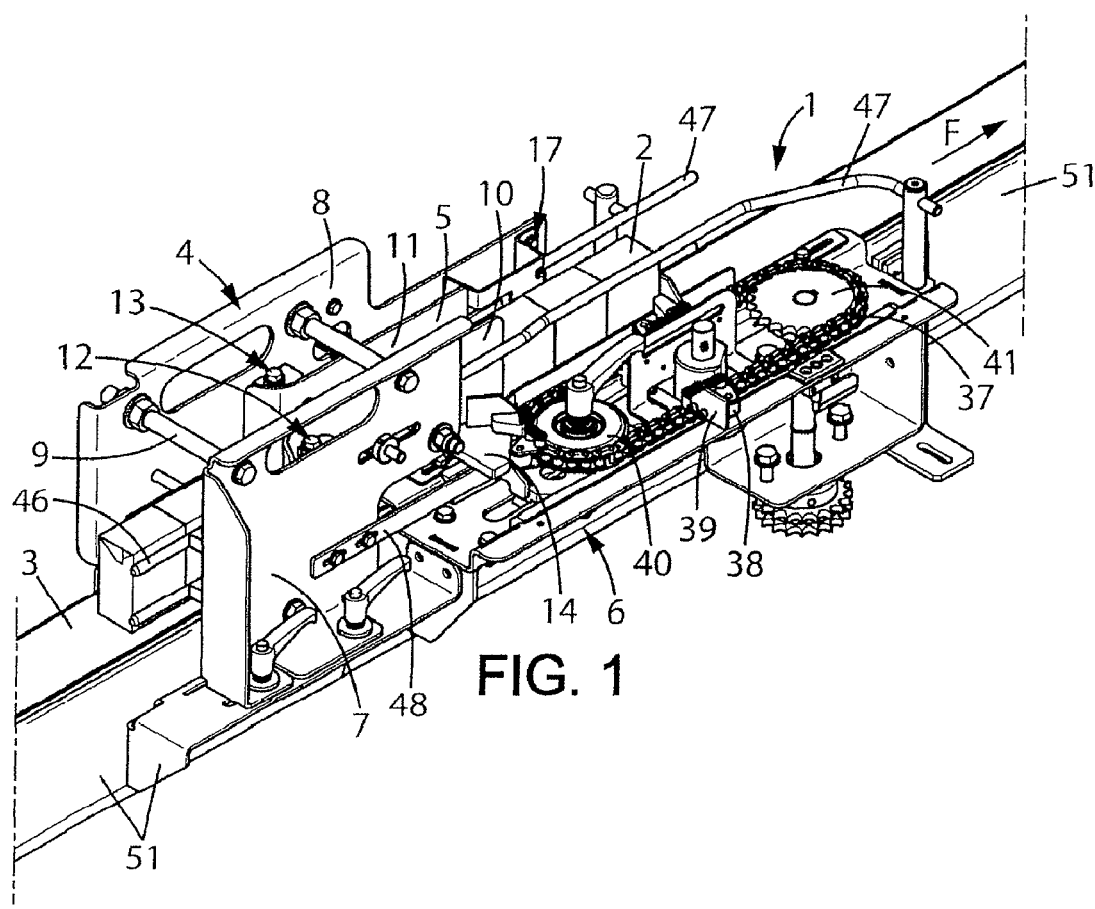
FIG. 1 is a perspective view of the device according to the invention for the formation of batches of objects moving continuously against each other on a conveyor belt.

FIG. 1 represents a perspective view of the device 1 according to the invention for forming batches of objects 2 moving continuously in line against each other, in single file, on a conveyor belt 3. The objects 2 are thus supplied, by means of the type known per se, upstream on the conveyor belt 3 continuously and adjacent to each other, in single file.

Figure 8:
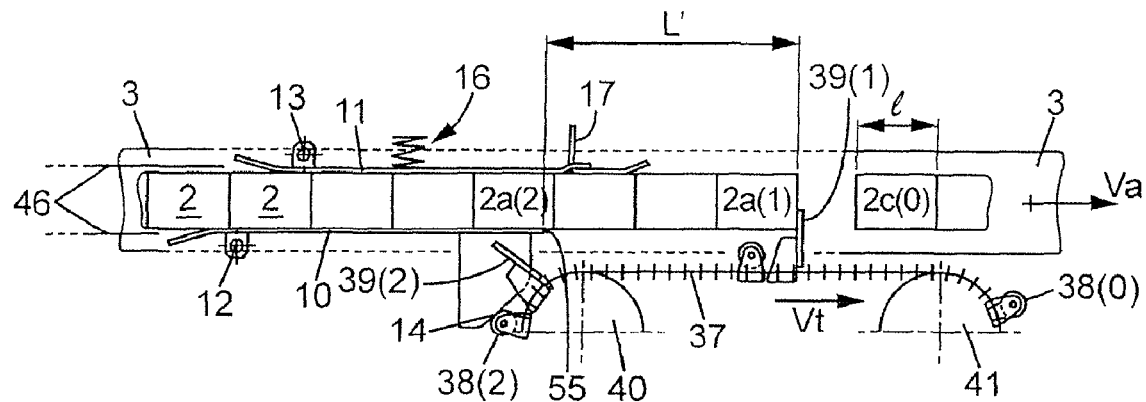
FIGS. 8 to 12 show various steps of batch preparation according to the method according to the invention.
Figure 9:
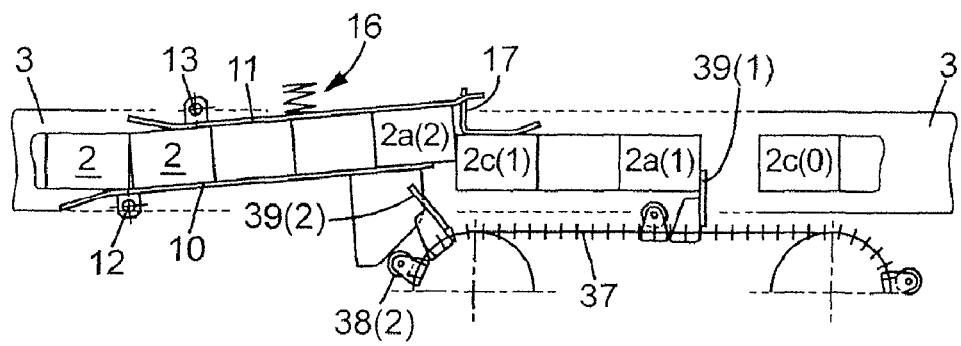
Figure 11:
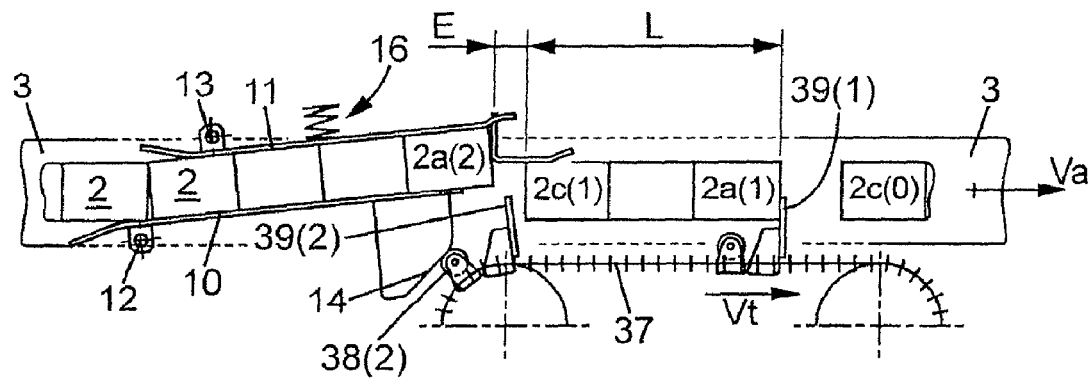
Figure 12:
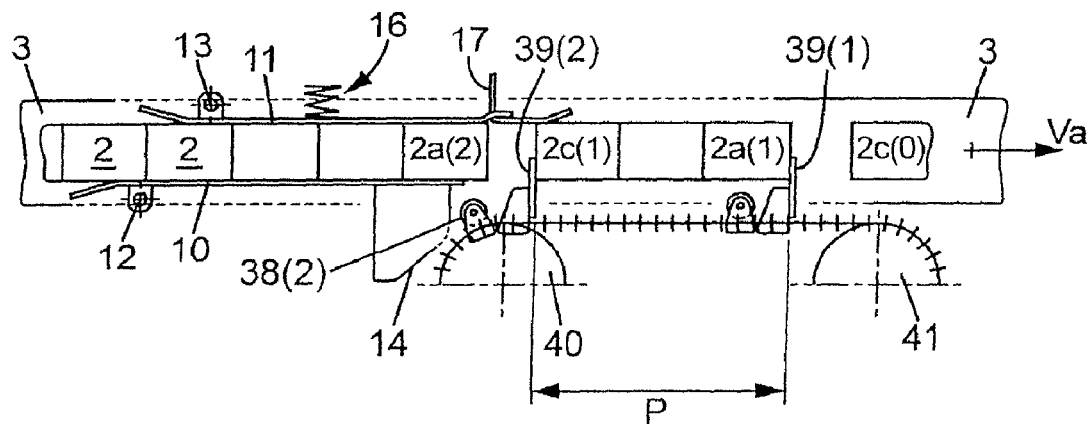

The objects 2 to be formed in batches, of the food carton type, have a parallelepiped shape; these objects 2 have a length l, as illustrated in FIG. 8, and the batch formed from these objects 2 has a length L, as illustrated in FIG. 11.

The device 1 according to the invention comprises—a support assembly 4 wherein a passage 5 is formed for the objects 2 and—an endless chain assembly 6, the function of which will be explained hereinafter.

The support assembly 4 consists of a first wall 7 and a second wall 8, parallel with each other, arranged on either side of the conveyor belt 3 and interconnected by a plurality of crosspieces 9, provided to be substantially transverse to the feed direction of the conveyor belt 3 and corresponding to the direction of the arrow F as illustrated in FIG. 1.

On the inner face of the wall 7, a side plate in the form of a pivoting flap 10 (or side leaf) is attached, wherein the pivoting is controlled by the endless chain assembly 6, whereas on the inner face of the wall 8, facing the flap 10, a side plate in the form of a flap 11 preferentially also provided as pivoting is also attached.

More specifically, to enable the blockage of the continuous flow of the objects 2 moving on the conveyor belt 3 and in the passage 5, said passage 5 is deformed by movement, preferentially by pivoting the pivoting side flap 10 attached on the first wall 7, which activates the movement of the objects on the conveyor belt 3 which then press against the side flap 11 of the second wall 8, thus causing the blockage of the objects housed between the two side flaps 10, 11.

The flap 10 forms the deflecting flap, i.e. the flap separating the objects 2 transversally, and the flap 11 forms the reactive flap in that it is maneuvered by said deflecting flap by means of said objects 2 and that, as detailed hereinafter, the reactive flap 11 returns said deflecting flap 10 to the idle position.

Each side flap 10, 11 is attached on the inner surface of the respective wall 7, 8 via attachment means consisting of axes 12, 13, respectively. These axes 12, 13, are positioned upstream from the flaps 10, 11, respectively, said flaps pivoting transversally in relation to the feed direction F of the objects 2 on the conveyor belt 3.

In order to facilitate the blockage of the queue, the entry of the passage 5 undergoes retraction, i.e. a reduction of the width thereof by moving both side flaps 10, 11 closer together during the pivoting thereof. This retraction is obtained by offsetting the pivoting axes 12, 13 of both side flaps 10, 11 in relation to each other in the feed direction F of the objects 2 on the conveyor belt 3, i.e. both pivoting axes do not belong to the same plane which is transverse to the feed direction F.

The axis 12 of the deflecting flap 10 is situated upstream from the axis 13 of the reactive flap 11, at a distance which is, for example, between the length l and half of said length l of the objects 2, said distance being measured on the longitudinal feed axis of said objects. This structural arrangement enables, with a relatively moderate force applied on the deflecting flap 10, the application of strong pressure on the object(s) 2 arranged at the entry of both flaps 10, 11, due to the lever effect provided by said deflecting flap 10 due to the position of the hinge axis 12 thereof.

In order to activate the pivoting of the deflecting flap 10, a cam 14 for controlling the pivoting of said flap 10 is provided, which is attached on the outer surface 10a thereof (see FIG. 2), i.e. on the surface opposite the surface suitable for coming into contact with the objects 2 moving on the conveyor belt 3.

The idle position of the deflecting flap 10 is established by an abutment 15 which is attached on the wall 7 as represented in FIGS. 2 to 5. When the cam 14 is not controlled and a flow of objects 2 is fed on the conveyor belt 3, the flap 10 is then substantially parallel to the feed direction F of the objects 2, said objects 2 when passing the passage 5 tending to push the side flaps 10, 11 outwards and thus press said flap 10 against the abutment 15.

The abutment 15 is made of a plastic or rubber material, whereon the deflecting flap 10 rests.

The reactive flap 11 attached on the second wall 8 of the support assembly 4 rests against spring means 16 suitable for applying a thrust force continuously on said flap 11, i.e. suitable for applying a thrust force substantially transverse to the feed direction F of the objects 2 and tending to press said flap 11 against the objects 2 moving on the conveyor belt 3.

In this way, in the embodiment illustrated in the various figures, the cam 14 tends to actuate the pivoting of the deflecting flap 10 in the anti-clockwise direction, whereas the spring means 16 tend to actuate the pivoting of the reactive flap 11 in the clockwise direction, the cam 14 and the spring means 16 being respectively provided downstream from the pivoting axes of the two flaps 10, 11 attached respectively on the walls 7, 8 of the support assembly 4.

Hereinafter in the description, the term "upstream" member refers to a member situated or moving upstream from the conveyor belt 3 and the term "downstream" member refers to a member situated or moving downstream from the conveyor belt 3. In other words, the conveyor belt 3 moves from an "upstream" member to a "downstream" member.

Figure 5:
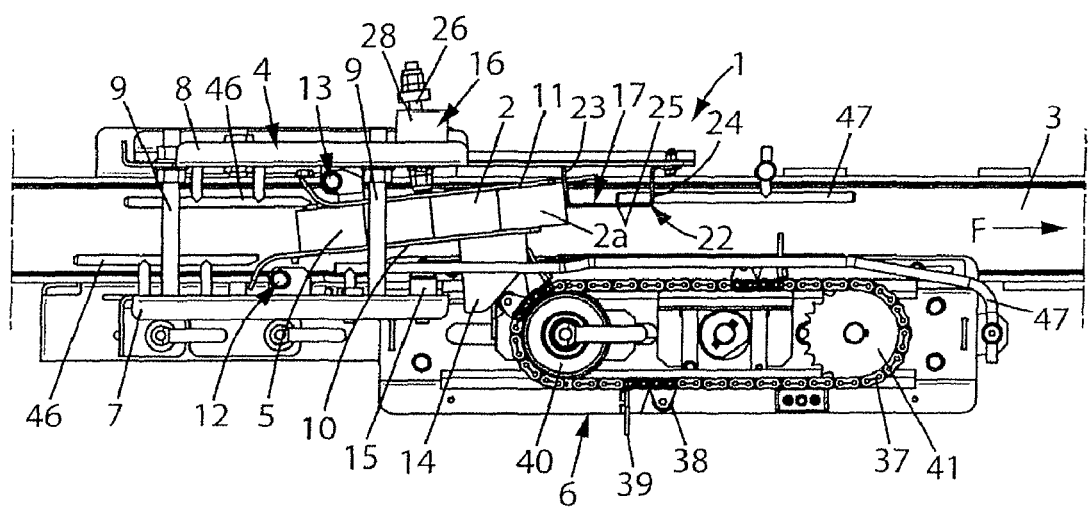

Additionally, the device 1 according to the invention may comprise a member 17 for holding the flow of objects 2, acting as an abutment, against which the object 2a at the front of the queue is liable to rest, as represented in FIG. 5.

Preferentially, the member 17 for holding the flow of objects 2 blocked between the flaps 10, 11, is attached to the same wall 8 as the flap 11 subject to the thrust force of the spring means 16.

Preferentially, the flaps 10, 11 block the flow of objects 2 in the passage 5 without the object 2a blocked most downstream abutting against the member 17 for holding the flow; the flaps 10, 11 block the queue at the entry of the passage 5 by restricting the width of said entry.

However, in the event of the failure of the clamping of the objects 2 in the passage 5, due, for example, to a dimensional variation of the object, the most downstream object 2a may not be sufficiently clamped between the two flaps 10, 11 and continue to move due to the feed movement of the conveyor belt 3 to the holding member 17.

Figure 2:
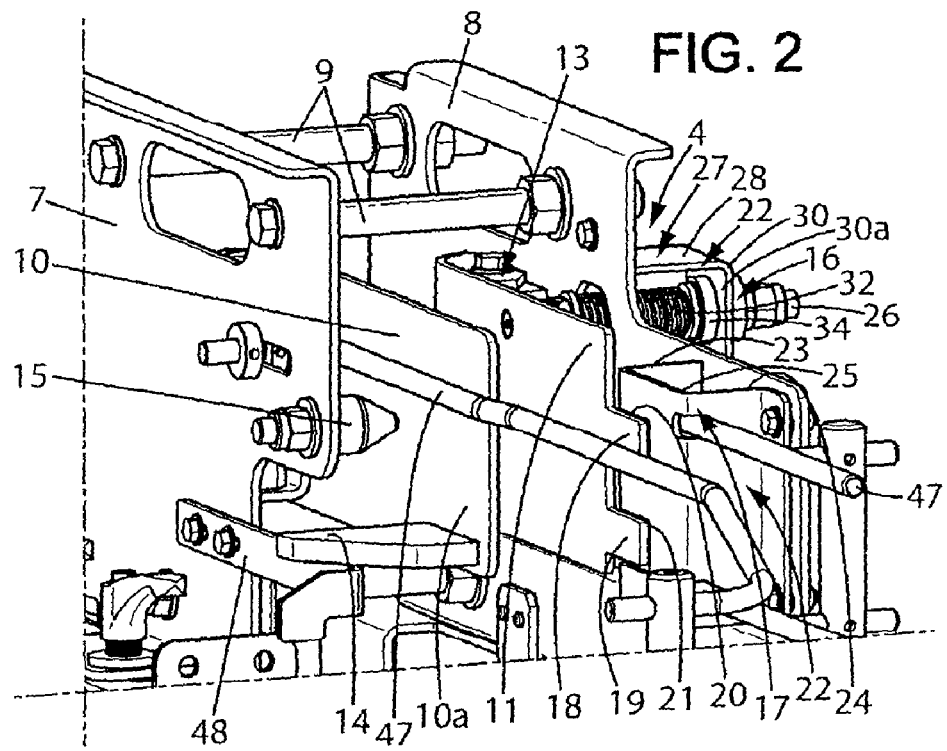
FIGS. 2 and 3 are two partial enlarged views of the support assembly of the passage of the objects at the exit whereof the batches of objects are formed.

Furthermore, in order to facilitate the return to the conveyor belt 3 of the downstream object abutting on the holding member 17, it is provided that the flap 11 comprises at the downstream end thereof at least one tooth 18, 19, as represented in FIG. 2, suitable for passing through the openings 20, 21 formed in the holding member 17 and moving the most downstream object 2a abutting against the member 17 for holding the flow.

More specifically, the holding member 17 is in the form of a U-shaped caisson consisting of two walls 23, 24, i.e. one upstream transverse wall 23 and one downstream transverse wall 24 preferentially attached by the free end thereof on the second wall 8 of the support assembly 4, and a rear wall 25, provided substantially parallel to the feed direction F. Objects 2 not blocked by the flaps 10, 11, but deflected anyway, abut against one of the two transverse walls 23, 24 (see FIG. 5).

The openings 20, 21 provided in the caisson 22 are advantageously formed in the upstream transverse wall 23, against which an object 2 is liable to abut, and in the wall 25 so that the teeth 18, 19 are substantially in the same plane as said wall 25. During the pivoting of the flaps 10, 11, the teeth 18, 19 move in the portion of the opening 20, 21 formed in the upstream transverse wall 23.

Figure 3:
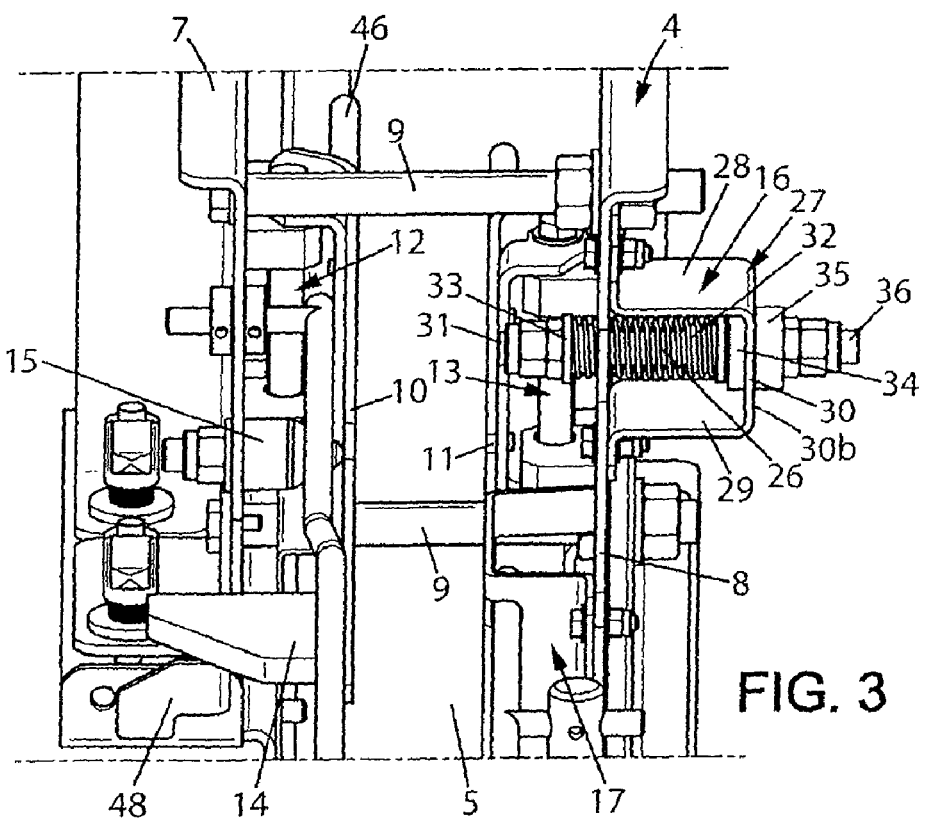
Figure 4:
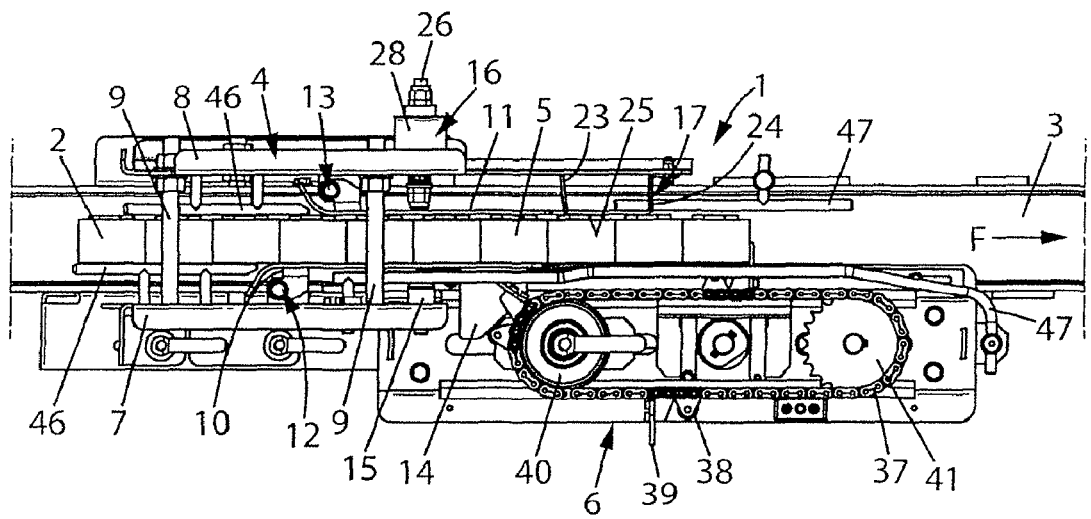
FIGS. 4 and 5 are two top views respectively illustrating the device according to the invention in an idle position and in a stopping position of the object flow for forming a batch of objects.

A possible embodiment of the spring means 16 is illustrated in FIG. 3.

The spring means 16 consist of a rod 26 passing through the wall 8 and a caisson 27, also attached on the outer face of said wall 8 (i.e. the face not facing the flow of objects 2 moving on the conveyor belt 3), the caisson 27 having an overall U-shape, with two walls 28, 29 forming the vertical arms of the U and wherein the ends are attached directly on the outer surface of the wall 8 and a rear wall 30 through which the rod 26 also passes.

The rod 26 comprises a first support end 31 suitable for coming into contact and pushing against the outer surface of the flap 11 attached on the wall 8.

A spring 32 is provided wound about the rod 26; this spring 32 rests, on one side, on a ring 33 which is arranged at the end 31 of the rod 26 and, on the other side, on a washer 34 which is attached on the inner surface 30a of the rear wall 30 of the caisson 27. This rod 26 passes through the wall 30 in the middle of the support washer 34 and a ring 35, acting as an abutment, is attached on the end of the rod 26; this ring 35 abuts on the outer surface 30b of the rear wall 30, when the flap 11 is substantially parallel to the feed direction F of the conveyor belt 3 and deviates therefrom when said flap 11 is pivoted to block the queue of objects 2.

Due to this embodiment of the spring means 16, the rod 26 is constantly subject to tension tending to increase the separation between the rear wall 30 and the end of the rod 26 resting against the flap 11. The spring 32 is contracted when said flap 11 is moved due to the pivoting of the deflecting flap 10 via the objects 2 positioned between same. The return movement of the flap 10 is actuated by the release of the spring 32 which pushes the flap 11 and, via the objects 2, said flap 10.

In order to control the pivoting of the deflecting flap 10 via the cam 14 attached on top, an endless chain assembly 6 is provided, preferentially provided to be removable and movable as for the support assembly 4. This assembly 6 comprises an endless chain 37 whereon at least one bearing roller 38 suitable for engaging on the cam groove formed by the cam 14 attached on the flap 10 is attached, along with a cleat 39, said cleat, for example in the form of an insert, is suitable for inserting in the gap between two objects 2 moving on the conveyor belt 3 at the exit of the passage 5 formed by the two flaps 10, 11. When it is inserted in the gap E formed between two objects, the cleat 39 is suitable for serving as a support for the most downstream object 2a of the flow of objects 2 blocked by the flaps 10, 11 in the pivoted position thereof (see FIG. 5).

The endless chain 37 is engaged on two toothed wheels 40, 41; at least one of the two wheels 40, 41 is suitable for moving along a direction substantially parallel to the feed direction F of the objects 2 on the conveyor belt 3.

This endless chain 37 is positioned laterally in relation to the conveyor belt 3 so as to enable the insertion of the cleats 39, attached on the chain 37, downstream from the most downstream object 2a of the flow of objects 2 which is blocked by the flaps 10, 11, when these objects 2, 2a return to the conveyor belt 3.

More specifically, in order to form batches of objects 2 at intervals from a continuous flow of objects 2 adjacent to each other moving on a conveyor belt 3 at continuous speed, the objects 2 firstly passes in the passage 5 at the exit wherefrom the batches of objects 2 are formed.

When the objects 2 pass in the passage 5 at least one flap 10 is then moved, preferentially by pivoting, in the direction of the flow of objects 2 moving on the conveyor belt 3 and in the direction of the other flap 11. Preferentially, since both flaps 10, 11 are provided pivoting, but with pivoting axes transversally offset in relation to each other, the pivoting of the flap 10 in the direction of the other flap 11 actuates the transversal deflection of the flow of objects 2 in relation to the feed direction F and, by reaction, the pivoting of said flap 11, via said objects 2.

Due to the transverse offset of the pivoting axes, the flaps 10, 11 no longer remain parallel with each other during this pivoting movement and tend to move closer together and apply a pressure force on either end of the objects 2 which holds and blocks these objects 2 between the flaps 10, 11, despite the feed movement of the conveyor belt 3.

The flap 10, by moving closer to the flap 11, also moves closer to the axis 13 thereof, which causes a retraction at the entry of the passage 5 formed by both flaps 10 and 11.

This closure at the entry of the passage 5 makes it possible to modify the pressure normally applied between the various objects 2 in single file; blocking the queue at the entry of the passage 5 makes it possible to release the pressure between the objects in said passage. For this purpose, the object 2a at the front in the passage 5, is not pressed between the abutment 17 by the other objects such that, when the flaps 10 and 11 return to the idle position, under the effect of the spring means 16, the object 2a is repositioned without any difficulty on the longitudinal conveying path.

During the blockage of the flow of objects 2, it is possible to insert a cleat 39 on the feed trajectory of the objects 2 on the conveyor belt 3 at the exit of the passage 5, said cleat 39 being inserted downstream from the most downstream object 2a of the objects 2 blocked by the flaps 10, 11 in the passage 5.

Given that the conveyed objects 2 are preferentially parallelepiped, it is indeed necessary to provide gaps in the continuous flow of objects 2 to enable the insertion of such a cleat 39 and, consequently, enable the formation of batches of objects, each batch consisting of the number of objects 2 positioned between two cleats 39 which are inserted successively in the flow of objects 2 at the exit of the passage 5. The cleats 39 are spaced by a pitch P which is substantially greater than the length L of the batch of objects, of the order of a few millimeters, between 1 and 5 mm depending on the nature of the objects.

In order to enable the release of the objects 2 blocked between the two flaps 10, 11, the pivoted flap 10 then returns to the initial position thereof, i.e. in a position substantially parallel with the feed direction of the conveyor belt 3. If two flaps 10, 11 are provided pivoting, the spring means 16 facilitate the return of said flaps 10, 11 to the position thereof, said spring means 16 applying a thrust force substantially directed towards the other of the two flaps 10, 11 and towards the conveyed objects 2.

Due to the return of the flaps 10, 11 to a non-pivoted position (said flaps both being substantially parallel to the feed direction F and having no influence on the feed of the flow of objects 2 on the conveyor belt 3), the objects 2 released on the conveyor belt 3 move until coming into contact with the most downstream object 2a of the objects 2 released on the cleat 39.

To enable the formation of a batch of objects 2 abutting on the cleat 39, the cleat 39 advances in a longitudinal direction, merged with the feed direction F of the objects 2.

Subsequently, as detailed hereinafter in relation to FIGS. 8 to 12, at the exit of the passage 5, a number of objects 2 corresponding to the number of objects 2 to form the batch of objects 2 to be formed is released, the most downstream object 2a of the flow remaining abutting against the cleat 39 and the other upstream objects 2 abutting against same in succession.

The advance speed Vt of the cleat 39 is, for this purpose, slightly less than the feed speed Va of the conveyor belt 3.

When the distance between the cleat 39 and the end of the flap 10 is equivalent to the length L of the batch of objects 2 provided, the roller 39, which is associated with the following cleat 39, comes into contact with the cam 14 of the deflecting flap 10 to stop the queue of objects 2 a second time.

The cycle is resumed sequentially; again, the deflecting flap 10 pivots, making it possible to form a further batch of objects 2 in turn held by the cleat 39, said batch comprising a number of objects 2 corresponding to the number of objects released on the conveyor belt 3 between two successive queue blocking steps by the flaps 10, 11.

Preferentially, the movement step preferentially by pivoting the deflecting step 10 arises from the roller 38 coming into contact on the cam 14 attached to the deflecting flap 10 and, more specifically, the step for placing the roller 38 in contact and the step for inserting a cleat 39 on the feed trajectory F of the objects 2, at the exit of the passage 5, are carried out using a step for feeding the endless chain 37 whereon said roller 38 and said cleat 39 are attached.

Figure 6:
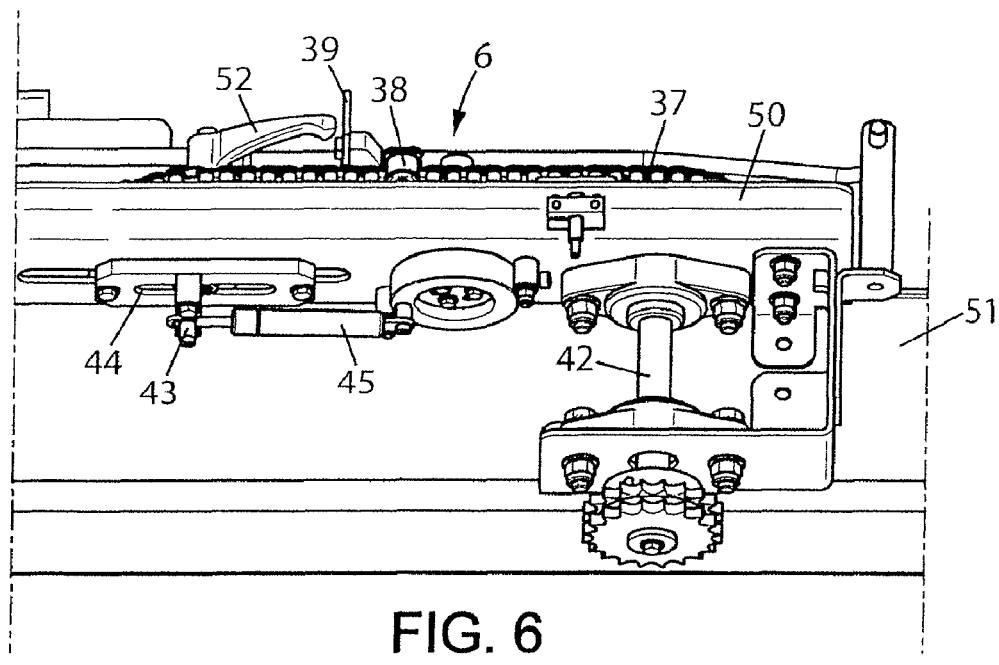
FIG. 6 is a perspective bottom view of the endless chain assembly of the device according to the invention.

Furthermore, as represented more specifically in a perspective bottom view in FIG. 6, the endless chain 37 assembly 6 is fitted on a frame 50 which is in turn rigidly connected to the general frame 51 of the conveyor, said frame 51 actually consisting of the sides of said conveyor.

It can thus be noted that the toothed wheel 41 is rotated using a driving shaft 42 connected to driving means, of the type known per se and not shown in FIG. 6, whereas the other toothed wheel 40 is provided to be movable to accommodate a plurality of chain 37 models, each chain being adapted to the dimension of the objects 2 and to the length of the batches to be formed. The position of the wheel 41 is fixed as it is related to the grouping means of the tight packaging machine located immediately downstream, as explained above.

The wheel 40 is mounted on a shaft 43 which is vertical and suitable for moving in a longitudinal groove 44 formed in the frame 50; the position thereof is lockable by clamping by means of the handle 52. The tension of the chain 37 is adjusted by means of a gas type cylinder 45, before the immobilization of the shaft 43 by the handle 52.

Additionally, to ensure improved guidance of the objects in the passage and at the exit of the passage, guide rails 46, 47 are provided attached to the walls 7, 8 suitable for guiding the objects 2 on the conveyor belt 3 both at the entry and exit of the passage 5.

When the format of the objects changes, along with the length of the batch, it is also necessary to adjust the position of the assembly 4, supporting the flaps 10 and 11, in relation to the endless chain assembly 6. To facilitate this adjustment of the position of the support assembly 4 in relation to the endless chain assembly 6, a positioning member 48 is provided, attached on the support assembly 4, for adjusting the distance between the support assembly 4 and the endless chain assembly 6.

For example, as represented in FIGS. 1 and 2, the positioning member 48 is an elongated rod wherein the end, at right angles, serves as a reference point and engages with the roller 38 to position the support assembly 4 in relation to the endless chain assembly 6.

FIG. 7 illustrates, in the form of a simple functional diagram, the essential members of the device according to the invention. The frame 51 of the conveyor comprises: the support assembly 4 which is positioned longitudinally on the belt 3 of said conveyor and the endless chain assembly 6 which is positioned laterally in relation to said belt 3, substantially downstream from said assembly 4.

As explained above, the assembly 4 is movable longitudinally in relation to the frame 51, guided by means of grooves or slides 53, to adapt the position of the cam 14 of the deflecting flap 10 in relation to the position of the rollers 38, said position of the rollers 38 and the cleats 39 being dependent on the type of objects 2 to be formed in batches and is also dependent on the size of the batch of objects.

The assembly 4 serves as a support for both flaps 10 and 11 defining the passage 5 wherein the queue of objects 2 is blocked. The deflecting flap 10 is hinged at the upstream portion thereof by means of an axis 12 and the reactive flap 11 is hinged about an axis 13 which is also situated at the upstream portion thereof, i.e. at the entry of the passage 5. Both axes 12 and 13 are offset longitudinally as specified above, by a distance d which is, for example, between l, and ½ l, where l, is the length of the objects 2. Preferably, this distance d is approximately ½ l.

The downstream end 55 of the flap 10 is slightly offset, in the longitudinal direction, in relation to the abutment 17; it is situated upstream from said abutment 17 to enable an anticipation of the movement of said flap 10 during the lateral offset of the front of the queue of objects 2 and to avoid knocking the last object of the batch being prepared. The distance a separating the downstream end 55 of the flap 10 and abutment 17 is between ½ and ¼ l.

The activation of the movement of the flap 10 results from the contact between the roller 38 and the cam 14 of said flap; said cam 14 is raised when the distance L' between the cleat 39 and the end 55 of the flap 10 corresponds substantially to the length L of the batch of objects to be formed.

FIGS. 8 to 12 below show the sequence of movements to create a gap in the queue, between two consecutive objects, and to form a batch of objects and guide same to the tight packaging machine, for example.

FIG. 8 shows the queue of objects 2 advancing with the conveyor belt 3 at a speed Va, held by the cleat 39(1) which is inserted between the object 2a(1) at the front of the queue and the last object 2 of the batch prepared. In FIG. 8, the cleat 39(1) is situated at a distance L' from the downstream end 55 of the flap 10, said distance being equivalent to the length L of the batch of objects to be prepared.

When the cleat 39(1) reaches this distance L', the roller 38(2) comes into contact with the cam 14 of the deflecting flap 10 and pivots same very rapidly. This pivoting of the flap in FIG. 9 deflects the objects 2 in the passage 5 defined by said flap 10 and the flap 11, on the side thereof, and places the object 2a(2) at the front of the queue facing the abutment 17.

The pivoting of the flap 10 also restricts the width of the entry of the passage 5 and blocks the queue upstream from said entry.

The queue is blocked and stopped almost instantaneously at the entry of the passage 5 and some relaxation of the products in said passage 5 due to the distance a separating the end 55 of the flap 10 and the abutment 17. This distance a enables the objects in the passage 5 clamped between the flaps 10 and 11 to decelerate and stop.

The blockage of the queue at the entry of the passage 5 makes it possible to release the contact pressure between the objects 2 in said passage 5 and, in particular, prevent the leading object 2a(2) from applying a strong pressure against the abutment 17. Excessive pressure between the object 2a(2) and the abutment could introduce excessive friction between the two with possible degradation of said objects and require a significant effort to reposition the deflected objects on the longitudinal axis of the conveyor belt 3. The flaps 10 and 11 are returned to the idle position by the spring means 16, as detailed hereinafter.

Figure 10:
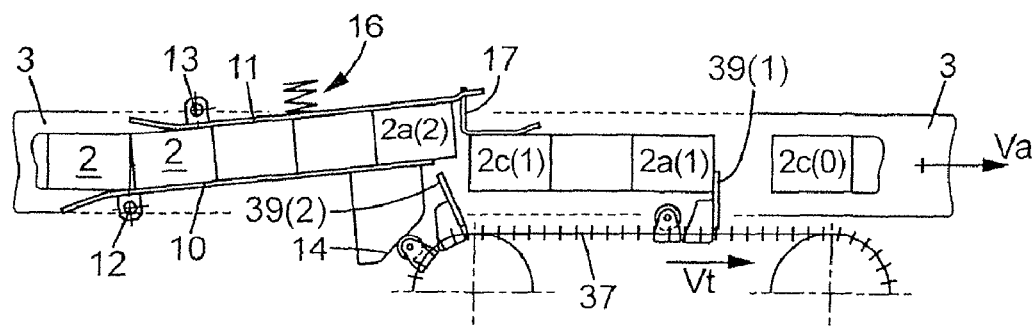

The pivoting of the flap 10 also enables the cleat 38(2) to pass in front of said flap 10 and, as can be seen in FIG. 10 hereinafter, it enables the positioning thereof behind the batch previously prepared, prior to insertion between the object 2a(2) and the last object 2c(1) of the previous batch.

During the blockage of the queue, the conveyor belt 3 continues to advance at a speed Va and it conveys the batch of three objects which are upstream from the abutment 17, FIG. 10. This new batch is handled by the cleat 38(1) wherein the longitudinal running speed Vt is substantially less than Va, of the order of the 10 to 15%, for example.

The cleat 39(1) continues to advance while controlling the movement of the prepared batch and the gap E between the objects 2c(1) and 2a(2) becomes sufficient, FIG. 11, for the safe insertion of the next cleat 39(2) in said gap. This gap E has a value of the order of ½ to ¼ l. At the same time, the roller 38(2) leaves the cam 14 and the flap 10 returns to the idle position resting on the abutment 15' as illustrated in FIG. 7. The flap 10 is returned automatically under the effect of the pressure applied via the objects 2 in the passage, which are realigned by the flap 11, in turn actuated by the spring means 16, FIG. 12.

The newly prepared batch is bordered by the cleats 39(1) and 39(2) and is maintained at the feed speed Vt of said cleats, making it possible to increase the distance between two successive batches by means of the difference in speed between the conveyor belt 3 and the chain 37 supporting said cleats. The cleats guide the batch prepared over a distance of the order of 1.5 times the length L of said batch, for example.

When the flaps 10 and 11 have returned to the idle position, the queue is released and the leading objects 2a(2) thereof gains on the cleat 39(2) which is inserted, and the cycle is resumed as described above, from FIG. 8.

The invention claimed is:

1. A device for implementation of a method for forming batches using objects moving in single file, adjacent to each other, forming a queue and conveyed by an endless belt of a conveyor configured to advance at a longitudinal speed Va by immobilizing said objects in said queue, on an entire length thereof, using stopping means which act sequentially, to create a gap between two consecutive objects and to isolate, downstream from said gap, a group of objects defining a batch with a programmed number of objects thereof, to insert into the gap thus created a first cleat having a longitudinal advance speed Vt lower than Va, to release said immobilized queue and having said first cleat handle same, at the leading object thereof, to start a new temporary immobilization of said queue, with a view to inserting a second cleat in the new gap thus created, when a distance covered by the first cleat measured from the end of said stopping means is equivalent to at least a length L of the batch of objects, to release the queue retained by said stopping means to have same handled by said second cleat, and to release the batch retained by said first cleat, starting another stoppage of the queue, the device comprising:

an immobilisation device that immobilises the queue on the entire length thereof so as to create a gap E between two consecutive objects of said queue and, cleats, suitable for being inserted in the gap E thus created, for handling the front of the immobilised queue, said immobilisation device and said cleats operating in a coordinated manner to start the immobilisation of the queue when the cleat for handling the queue, after said queue has been released, has covered a distance L' which, measured from the end of said immobilisation device, is equivalent at least to the length L of the batch to be prepared, wherein the queue immobilization device comprises:

flaps arranged facing each other forming a passage, wherein the objects pass: one deflecting flap and one reactive flap, each flap being movable about a vertical axis situated on the upstream portion thereof;

means for pivoting said deflecting flap in the direction of the reactive flap; and spring means for impeding reaction movement of said reactive flap when said reactive flap is pushed, by means of the objects, by the deflecting flap.

2. The device according to claim 1, wherein axes of the flaps are offset longitudinally: the axis of the reactive flap being situated downstream from the axis of the deflecting flap, at a distance of the order of half the length of the objects, said distance being measured on a longitudinal feed axis of the objects.

3. The device according to claim 1, wherein the reactive flap is retracted, under an effect of the deflecting flap, via the objects arranged between same, said reactive flap, by retracting, releasing an abutment capable of temporarily holding an upstream object forming the front of the queue immobilised by clamping, serving as an actual safety abutment.

4. The device according to claim 1, wherein the cleats are regularly distributed and carried by a motor-driven endless chain wherein an active side is parallel with an object feed direction and arranged downstream from the deflecting flap, said cleats being spaced by a pitch which is substantially greater than the length L of the batch of objects, of the order of a few millimeters, between 1 and 5 mm depending on the type of objects.

5. The device according to claim 4, wherein each cleat is associated, on an endless chain, with a member in the form of a roller for manoeuvring the deflecting flap, said roller engaging with a cam-shaped fitting thereof so as to pivot said flap as said cleat approaches same, an assembly formed by the roller and the cam making it possible to coordinate the clamping of the queue and the passage of the cleat for the insertion thereof in the gap created by the immobilisation of said queue.

6. The device according to claim 5, wherein the reactive flap is subject to the action of spring means, said reactive flap performing the automatic repositioning of the deflecting flap via the objects moving between same when released from a manoeuvring member thereof, in this instance, when the roller leaves the cam of said deflecting flap.

7. The device according to claim 5, wherein the deflecting and reactive flaps and the downstream abutment are arranged on the same assembly structure wherein the position is longitudinally adjustable in relation to a general frame to adapt to changes in the formats of the objects and/or the batches to be formed, said assembly structure being adjusted longitudinally in relation to the position of the upstream guiding wheel of the endless chain comprising the rollers and the cleats, said position of said upstream wheel being in turn longitudinally adjustable to accommodate different chain models wherein said cleats and rollers are distributed according to a pitch suited to the length L of said batches to be prepared.

8. The device according to claim 1, wherein the length of the deflecting flap is of the order of the length of the batches of objects to be prepared, of the order of three to five objects.

* * * * *